United States Patent [19]
Duffy

[11] 3,818,624
[45] June 25, 1974

[54] TROLLING DEVICE

[76] Inventor: William M. Duffy, W152 N7124 Westwood Dr., Menomonee Falls, Wis. 53051

[22] Filed: Jan. 12, 1973

[21] Appl. No.: 323,014

[52] U.S. Cl. ............................................. 43/43.13
[51] Int. Cl............................................ A01k 91/00
[58] Field of Search................ 43/43.13, 42.74, 26.1

[56] References Cited
UNITED STATES PATENTS

| | | | |
|---|---|---|---|
| 1,466,601 | 8/1923 | Sanders | 43/43.13 |
| 2,582,754 | 1/1952 | Kahler | 43/43.13 |
| 3,057,106 | 10/1962 | Wheeler | 43/25 |
| 3,181,266 | 5/1965 | Leufvenius | 43/43.13 |
| 3,410,014 | 11/1968 | Jenssen | 43/43.13 X |
| 3,464,142 | 9/1969 | Hubbart | 43/43.13 |

Primary Examiner—James H. Czerwonky
Attorney, Agent, or Firm—Wheeler, Morsell, House & Fuller

[57] ABSTRACT

A trolling device for fishing includes a planing board with a weighted keel structure which is inclined at an angle with respect to the center line of the planing board to maintain the board to the side of the towing vessel. The trolling device also includes a trip release for detachably holding a fish line to the planing board with the trip release being adjustable to increase or decrease clamping tension on the fish line and a button for separation of the clamping members to enable easy manual engagement and disengagement of the fish line from the trip release.

3 Claims, 3 Drawing Figures

PATENTED JUN 25 1974
3,818,624
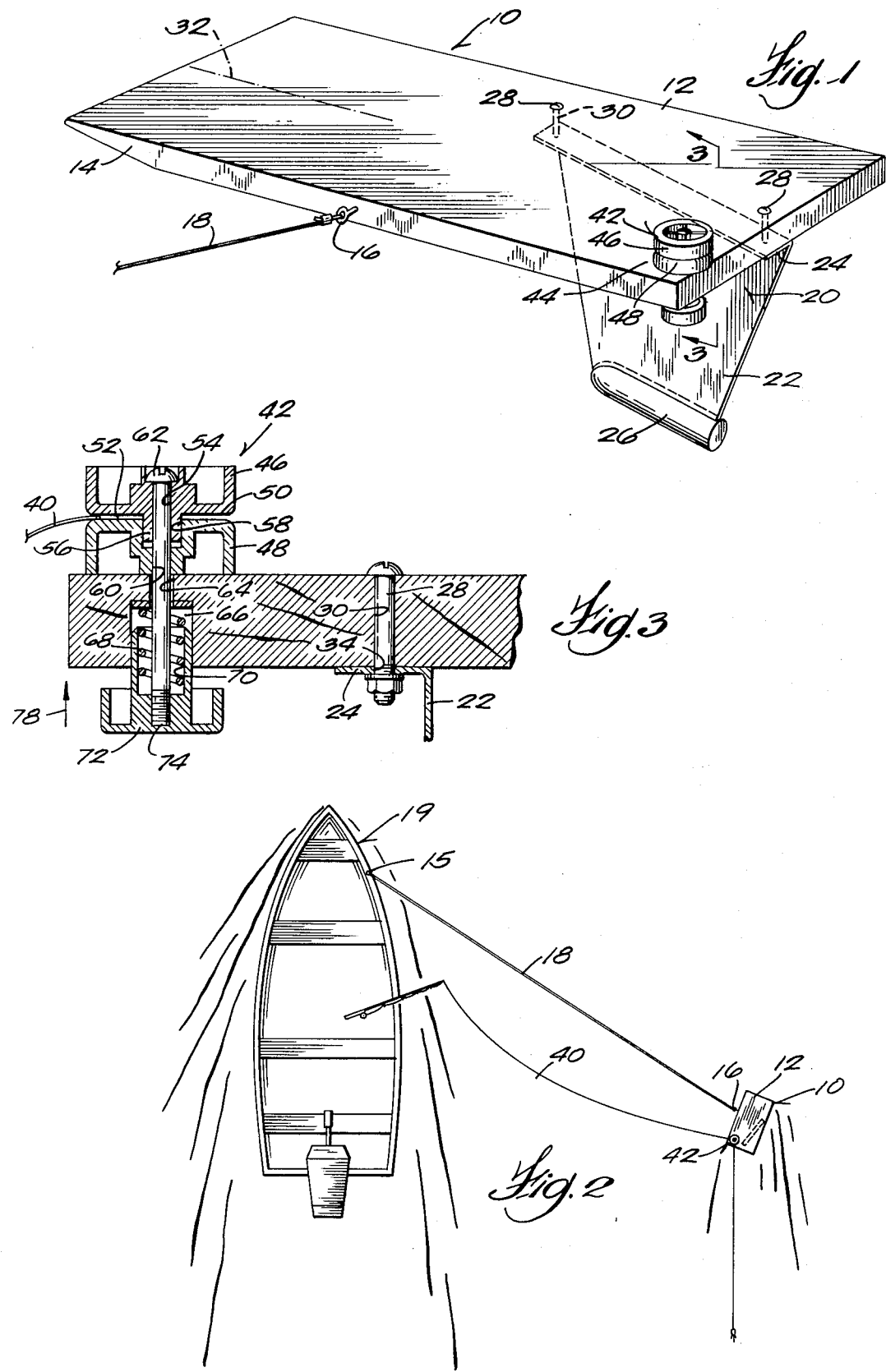

3,818,624

TROLLING DEVICE

BACKGROUND OF THE INVENTION

The use of outrigging attachments and trolling floats enables convenient use of multiple lines during trolling with a minimum of line tangles. In addition, outriggers enable one or more lines to be maintained in an offset relation with respect to the towing vessel to increase the surface area being fished, eliminate the need for holding the fishing rod at all times and position the lines away from boat and prop turbulence. To accomplish these results, the device holding the fish line offset from the towing vessel must remain at a steady course in relation to the towing vessel during a change in course of the towing vessel to avoid tangles between the various trailed lines. In addition, the device for holding the fish line must provide a sure release of the line upon a strike by a fish and must not accidentally release the line during heavy wavy action, or the drag pressure caused by heavy sinkers and lures.

SUMMARY OF INVENTION

The trolling device of the invention includes a planing board pulled along the surface of the water with a towline attached to a tow or fishing vessel which is provided with a keel structure which is weighted to stabilize the board and inclined at an angle with respect to the longitudinal center line or medial axis of the board to cause a force component tending to steer the planing board outwardly away from the towing vessel.

The planing board also includes a trip release or clamp for clinching and holding the fish line during trolling which is adjustable to vary tension between two opposed clamping members. The fish line is released from the clamp either by the strike of a fish on the trailed lure or a sharp twitch of the fishing rod by the fisherman. The clamp includes a button or plunger to overcome the bias of the spring and separate the clamping members to facilitate the manual engagement or disengagement of a line.

The planing board skims the surface of the water and thus the course direction is not appreciably affected by rough water. The fish line clamp is easily adjusted for lures and sinkers of various weights and differing boat speeds to insure proper release under all conditions. In addition, easy positive release of the line from the clamp enables the fish to pull the line from the planing board and obtain sufficient slack to swallow the lure and become securely hooked.

Further objects, advantages, and features of the invention will become apparent from the following disclosure.

DESCRIPTION OF DRAWINGS

FIG. 1 is a side and rear perspective view of a trolling device in accordance with the invention.

FIG. 2 is a plan view on reduced scale showing a trolling device in use with a fishing boat.

FIG. 3 is an enlarged fragmentary sectional view along line 3—3 of FIG. 1.

The trolling device 10 includes a planing board 12 with a beveled bow 14 and an eye 16 intermediate the length of the board 12 for connection to a towline 18 which is attached at 15 (FIG. 2) to the tow vessel or fishing boat 19.

The board 12 is provided with a keel structure 20 which includes a web portion 22 having a mounting flange 24 and a torpedo weight 26. Bolts 28 extending through apertures 30 in the planing board and apertures 34 in the mounting flange secure the keel 20 to the planing board. The keel 20 is oriented transversely to the longitudinal center line or medial axis 32 of the planing board and located at the rear of the board 12 to keep the bow 14 slightly raised. In addition, the angle of the keel 20 causes the trolling device 10 to move outwardly at an angle with respect to the towing vessel 19 with a force component at an angle with respect to the course direction of the vessel 19 to insure that the trolling device 10 remains spaced from the towing vessel 19.

To detachably secure the fish line 40 to the planing board 12, the invention provides a trip release or clamp 42 which is located rearwardly at the corner 44 of the board 12 on the side of the board adjacent the vessel 19. The clamp 42 includes a pair of clamping members 46 and 48 respectively having clamping surfaces 50 and 52. The clamping member 46 has a reinforced aperture 54 with an axially projecting boss 56 which is received in a counterbore 58 for an aperture 60 in the clamping member 48. The counterbore 58 and boss 56 afford relative and guided movement between the two clamping members 46 and 48 as presently described. A bolt 62 extends through the apertures in the clamping members 46 and 48 and through an aperture 64 in the planing board which terminates in a counterbore 66. The clamping member 46 is biased against the clamping member 48 by a spring 68 which is arranged around the bolt 62 and located within a sleeve portion 70 of a plunger and tension adjusting knob 72. The plunger 72 is normally spaced from the undersurface of the planing board and the sleeve portion is received in the counterbore 66. The bolt 62 is threadably received in a threaded aperture 74 in the plunger 72. When the plunger is pushed toward the board in the direction shown by arrow 78, it releases and spaces the clamping surfaces 50 and 52 to enable insertion or removal of the fish line 40. The tension between the clamping members is adjusted by appropriately rotating the knob 72 to compress the spring 68. Thus the trip release can be adjusted appropriately for the weight of the trolled bait, water conditions and drag to enable effective release upon the strike of a fish.

Although FIG. 2 shows a single trolling device 10 in use, starboard of the towing vessel, a second trolling device is desirably employed on the port side of the vessel with the keel structure diverging forwardly away from the bow side or left side of the towing vessel as viewed in FIG. 2. The clamping device 42 is positioned on the side of the planing board adjacent the towing vessel.

What is claimed is:

1. A trolling device comprising a planing board, means on said planing board for detachably clinching a fish line, said means including opposed clamping members, a spring for biasing said clamping members into clamping engagement, and means for adjusting tension of said spring and for overcoming the bias of said spring to separate the clamping members and wherein said means for detachably clinching said fish line includes a boss mounted on one of said clamping members, an aperture through said boss, said boss projecting axially from the clamping surface, a counterbore in the other of said clamping members for receiving said boss, a bolt extending through said aperture in said boss, said other clamping member and through said planing board, a tension adjusting and pressure release knob having an aperture threadably receiving said bolt, said knob including a hollow sleeve portion and wherein said spring is arranged around said bolt and located in said sleeve portion between said knob and said planing board to bias one of said clamping members against the other clamping member with said knob affording adjustment of spring tension and being reciprocal in said bore in said planing board to release clamping pressure by manual manipulation of the knob to afford separation of said clamping members.

2. A trolling device in accordance with claim 1 including a keel structure connected to said hull and offset at an angle with respect to the longitudinal center line of the board.

3. A trolling device in accordance with claim 2 wherein said keel structure is located adjacent the rear of said planing board and including an eye on said planing board for attachment to a towline, said eye being located forwardly of said keel and wherein said means for detachably clinching the fish line is located adjacent the rear of the planing board.

* * * * *